(12) United States Patent
Ozonat et al.

(10) Patent No.: US 8,914,416 B2
(45) Date of Patent: Dec. 16, 2014

(54) SEMANTICS GRAPHS FOR ENTERPRISE COMMUNICATION NETWORKS

(71) Applicant: Hewlett-Packard Development Company, L.P., Houston, TX (US)

(72) Inventors: Mehmet Kivanc Ozonat, San Jose, CA (US); Claudio Bartolini, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 143 days.

(21) Appl. No.: 13/755,556

(22) Filed: Jan. 31, 2013

(65) Prior Publication Data

US 2014/0214858 A1 Jul. 31, 2014

(51) Int. Cl.
*G06F 7/00* (2006.01)
*G06F 17/30* (2006.01)

(52) U.S. Cl.
CPC .... *G06F 17/30958* (2013.01); *G06F 17/30731* (2013.01); *G06F 17/30961* (2013.01)
USPC ........... 707/798; 707/802; 707/803; 707/804; 707/805

(58) Field of Classification Search
CPC .................... G06F 17/30731; G06F 17/30958; G06F 17/30961
USPC ......... 707/790, 791, 797, 798, 802, 803, 804, 707/805
See application file for complete search history.

(56) References Cited

U.S. PATENT DOCUMENTS

| | | | |
|---|---|---|---|
| 6,947,923 B2 | 9/2005 | Cha et al. | |
| 6,950,827 B2 | 9/2005 | Jung | |
| 7,072,883 B2 | 7/2006 | Potok et al. | |
| 7,103,580 B1 | 9/2006 | Batachia et al. | |
| 7,296,001 B1 | 11/2007 | Ephrati et al. | |
| 7,433,841 B2 | 10/2008 | Byde et al. | |
| 7,562,002 B2 | 7/2009 | Rzevski et al. | |
| 7,693,683 B2 | 4/2010 | Ihara | |
| 7,823,055 B2 | 10/2010 | Sull et al. | |
| 8,103,614 B2 | 1/2012 | Tseng et al. | |
| 8,171,029 B2 * | 5/2012 | Marvit et al. | 707/740 |
| 2006/0074980 A1 | 4/2006 | Sarkar | |
| 2007/0033221 A1 * | 2/2007 | Copperman et al. | 707/103 R |
| 2008/0133479 A1 | 6/2008 | Zelevinsky et al. | |
| 2008/0140389 A1 * | 6/2008 | Funakoshi et al. | 704/9 |
| 2009/0234832 A1 * | 9/2009 | Gao et al. | 707/5 |
| 2009/0313173 A1 | 12/2009 | Singh et al. | |
| 2010/0198841 A1 | 8/2010 | Parker et al. | |
| 2010/0228742 A1 * | 9/2010 | Vandelle et al. | 707/750 |
| 2011/0179084 A1 * | 7/2011 | Waddington et al. | 707/794 |
| 2012/0078612 A1 | 3/2012 | Kandekar et al. | |

OTHER PUBLICATIONS

Cao, Mukun., "Multi-strategy Selection Supported Automated Negotiation System Based on BDI Agent," 2012 45th Hawaii International Conference on System Sciences, Jan. 4-7, 2012, pp. 638-647.

(Continued)

*Primary Examiner* — Hares Jami

(57) ABSTRACT

Building a semantics graph for an enterprise communication network can include calculating a distance metric between a first signifier and a second signifier associated with an enterprise communication network, wherein the distance metric includes a plurality of relationships defined based on a frequency of co-occurrences of the first signifier and the second signifier, and building a semantics graph for the enterprise communication network using the calculated distance metric.

9 Claims, 3 Drawing Sheets

(56) References Cited

OTHER PUBLICATIONS

Hasan, et al., "Approximate Semantic Matching of Heterogeneous Events," The 6th ACM International Conference on Distributed Event-Based Systems, Jul. 16-20, 2012, Berlin, Germany, 12 pages.
Krapac, et al., "Learning Tree-structured Descriptor Quantizers for Image Categorization," Retrieved from http://hal.inria.fr/docs/00/61/31/18/PDF/paper.pdf, Aug. 2011, 11 pages.
Menczer, Filippo., "Combining Link and Content Analysis to Estimate Semantic Similarity," The 13th International World Wide Web Conference, May 17-22, 2004, New York, NY, 2 pages.
Caro, et al., "Using tagFlake for Condensing Navigable Tag Hierarchies from Tag Clouds," The 14th ACM SIGKDD International Conference on Knowledge Discovery and Data Mining, Aug. 24-27, 2008, Las Vegas, NV, USA, pp. 1069-1072.
Begelman, et al., "Automated Tag Clustering: Improving search and exploration in the tag space," Retrieved from http:tagging.pui.ch/automated_tag_clustering/, May 2006, 11 pages.
Russell, et al., "A grammar-based distance metric enables fast and accurate clustering of large sets of 16s sequences," BMC Bioinformatics 2010, Retrieved from http://digitalcommons.uni.edu/cgi/viewcontent.cgi?article=1189&context=electricalengineeringfacpub, Dec. 17, 2010, 14 pages.
Faratin, et al., "Negotiation Decision Functions for Autonomous Agents," Department of Electronic Engineering, Queen Mary and Westfield College, University of London, London, UK, Oct. 22, 1997, 38 pages.
Fatima, et al., "Multi-Issue Negotiation Under Time Constraints," Proceedings of the ACM First International Joint Conference on Autonomous Agents and Multiagent Systems, AAMAS 2002, Jul. 15-19, 2002, Bologna, Italy, 8 pages.
Fatima, et al., "An Agenda Based Framework for Multi-Issue Negotiation," Department of Computer Science, University of Liverpool, Liverpool, UK, Mar. 28, 2003, 50 pages.
Coehoorn, et al., "Learning an Opponent's Preferences to Make Effective Multi-Issue Negotiation Trade-Offs," Proceedings of the 6th International Conference on Electronic Commerce, Delft, The Netherlands, Oct. 25-27, 2004, 10 pages.
Ito, et al., "Multi-Issue Negotiation Protocol for Agents: Exploring nonlinear utility spaces," Proceedings of the 20th International Joint Conference on Artificial Intelligence, Jan. 6-12, 2007, Hyderabad, India, 6 pages.
Van Kleef, et al., "The Interpersonal Effects of Anger and Happiness in Negotiations," Journal of Personality and Social Psychology, vol. 86, No. 1, Jan. 2004, pp. 57-76.
Van Kleef, et al., "The Interpersonal Effects of Emotions in Negotiations: A Motivated Information Processing Approach", Feb. 13, 2003, 30 pages.
Vetschera, Rudolf., "Preference structures and negotiator behavior in electronic negotiations", Decision Support Systems, vol. 44, Mar. 28, 2007, pp. 135-146.
Yukl., Gary A., "Effects of Situational Variables and Opponent Concessions on a Bargainer's Perception, Aspirations, and Concessions", Journal of Personality and Social Psychology, vol. 29, No. 2, May 1974, pp. 227-236.

\* cited by examiner

SEMANTICS GRAPHS FOR ENTERPRISE COMMUNICATION NETWORKS

BACKGROUND

Crawling and retrieval of web content can include browsing the World Wide Web in a methodical and/or orderly fashion to create a copy of visited pages for later processing by a search engine. However, due to the current size of the Web, search engines cannot index the entire Web.

Prior approaches to crawling and retrieving web content include the use of focused web crawlers. A focused web crawler estimates a probability of a visited page being relevant to a focus topic and retrieves a link corresponding to the page only if a target probability is reached; however, a focus web crawler may not retrieve a sufficient number of links or sufficiently relevant links. For example, a focus web crawler can download only a fraction of Web pages visited.

DETAILED DESCRIPTION

Figure 1:
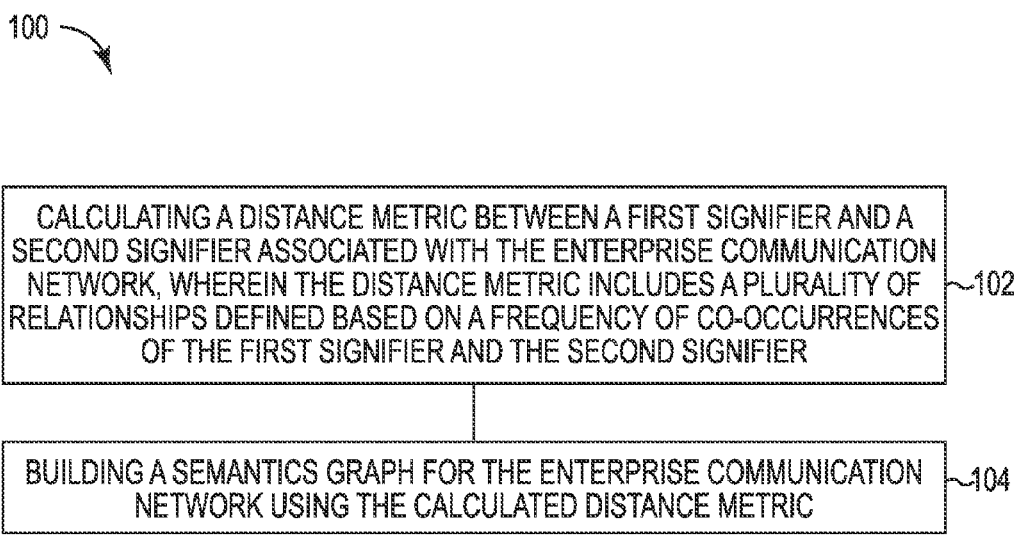
FIG. 1 is a block diagram illustrating an example of a method for building a semantics graph for an enterprise communication network according to the present disclosure.

An enterprise may use an enterprise network, such as a cloud system and/or Internet network, to distribute workloads. An enterprise network, as used herein, can include a network system to offer services to users of the enterprise (e.g., employees and/or customers). A service, as used herein, can include an intangible commodity offer to users of a network. Such services can include computing resources (e.g., storage, memory, processing resources) and/or computer-readable instructions (e.g., programs). A user may benefit from another user's experience with a particular service. However, due to the distributed nature of an enterprise network, users may have difficulty in sharing knowledge, such as services experiences.

In some situations, an enterprise may use an enterprise communication network to assist users of an enterprise network in sharing knowledge, learning from other users' services experiences, and searching for content relevant to the enterprise and/or the enterprise network. The enterprise communication network, as used herein, can include an electronic communication network to connect users of the network to relevant content. Users of the enterprise communication network can contribute to the enterprise communication network through a range of activities such as posting service-related entries, linking entries to content available on internal and external domains, reading comments, commenting on comments, and/or voting on users' entries. Thereby, the enterprise communication network can act as a social network associated with the enterprise, services offered by the enterprise, and/or documents associated with the enterprise, among other topics.

However, the range of activities that users can contribute to an enterprise communication network can result in the enterprise communication network containing unstructured content. Due to the unstructured nature of the content, a general purpose search engine may not properly function to allow users to search for content in the enterprise communication network. General purpose search engines may utilize measures such as back-links and/or clicks to define a quality and reputation of searched content. In an enterprise communication network, the quality and reputations of content may not be proportional to the number of back-links and/or clicks.

In contrast, in examples of the present disclosure a relatedness of content within the enterprise communication network can be identified by automatically learning semantics of signifiers within the enterprise communication network and/or the enterprise network. The signifiers can be identified by gathering content using a search tool and extracting signifiers from the gathered content. A relatedness of the identified signifiers can be defined by calculating a distance metric between pairs of signifiers. Using the defined distance metric, a semantics graph can be built that identifies the proximity of relations between the signifiers. A semantics graph can assist in tagging and searching for content within the enterprise communication network.

Examples of the present disclosure may include methods, systems, and computer-readable and executable instructions and/or logic. An example method for building a semantics graph for an enterprise communication network can include calculating a distance metric between a first signifier and a second signifier associated with an enterprise communication network, wherein the distance metric includes a plurality of relationships defined based on a frequency of co-occurrences of the first signifier and the second signifier, and building the semantics graph for the enterprise communication network using the calculated distance metric.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and the process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, "a number of" an element and/or feature can refer to one or more of such elements and/or features.

FIG. 1 is a block diagram illustrating an example of a method 100 for building a semantics graph for an enterprise communication network according to the present disclosure. The method 100 can be used to build a semantics graph for an enterprise communication network containing a plurality of signifiers.

An enterprise communication network, as used herein, can include a network connecting a plurality of users and content through a range of activities. The activities can be related to a services network of the enterprise (e.g., enterprise network). For example, the activities can include posting service-related entries, linking entries to internal enterprise domains and/or external domains, and/or reading, commenting, and/or voting on other user's entries. In various examples of the present disclosure, the enterprise communication network can be a sub-portion and/or contained within the enterprise network.

A semantics graph, as may be built using the method 100, can allow users of the enterprise communication network to search for content within the enterprise communication network. A general purpose search engine may not be able to search for content in the enterprise communication network given the unstructured nature of the content. Such a search engine may function by defining a quality and reputation of content (e.g., domains) based on a number of back-links (e.g., links from other content) and/or clicks by a user. However, content in the enterprise communication network may not have proportional back-links and/or clicks to the quality and/or reputation of the content. In some instances, content in the enterprise communication network may not have measureable back-links and/or clicks (e.g., email). In order to search content within the enterprise communication network, semantics of signifiers within the enterprise network may be automatically learned. For instance, automatically learning the semantics of signifiers can include building a semantics graph to identify proximity of signifiers using the method 100.

At 102, the method 100 for building a semantics graph for an enterprise communication network can include calculating a distance metric between a first signifier and a second signifier associated with the enterprise communication network, wherein the distance metric includes a plurality of relationships defined based on a frequency of co-occurrences of the first signifier and the second signifier. For instance, the plurality of relationships can be based on a frequency of co-related services, a frequency of co-related phrases, and an average location of the first signifier and the second signifier (as discussed further herein).

A signifier, as used herein, can include a word, phrase, and/or acronym within the content of the enterprise network and/or the enterprise communication network. The signifiers can be gathered, in various examples, using search tools (e.g., web crawlers) and extraction tools (e.g., extractors) (as discussed further herein). A signifier associated with the enterprise communication network can include a signifier gathered from the enterprise network and/or the enterprise communication network.

A distance metric, as used herein, can include a numerical score calculated. The numerical score can represent the proximity of relation between a first signifier and a second signifier. For instance, calculating the distance metric can include calculating a weighted Euclidean distance including constructing an n-dimensional feature vector. A Euclidean distance can include an ordinary distance (e.g., numerical description of a distance) between two points. The distance metric can be based on a plurality of criteria to construct the n-dimensional feature vector. Such criteria can be based on a frequency of co-occurrences of the first signifier and the second signifier in the enterprise network and/or the enterprise communication network (e.g., a plurality of relationships). Examples of co-occurrences can include the first signifier and the second signifier in the same list, table, paragraph, and/or linked content (e.g., domains), among other co-occurrences.

At 104, the method 100 for building a semantics graph for an enterprise communication network can include building the semantics graph for the enterprise communication network using the calculated distance metric. A semantics graph, as used here, can include a data structure representing concepts that are related to one another. The concepts can include language (e.g., words, phrases, acronyms), for instance. The semantics graph can include a plurality of nodes connected by a plurality of edges. A node can include a vertex representing a signifier. The edges can connect related signifiers. Each edge can be weighted with the score defined by the calculated distance metric between pairs of related signifiers (e.g., the first signifier and the second signifier). Weighting an edge with a score, as used herein, can include associating the score with the edge connecting a pair of related signifiers.

For instance, the method 100 can include adding the first signifier and the second signifier as nodes on the semantics graph with an edge connecting the first signifier and the second signifier. The edge connecting the first signifier and the second signifier can be weighted with a score defined by the calculated distance metric, in various examples.

Figure 2:
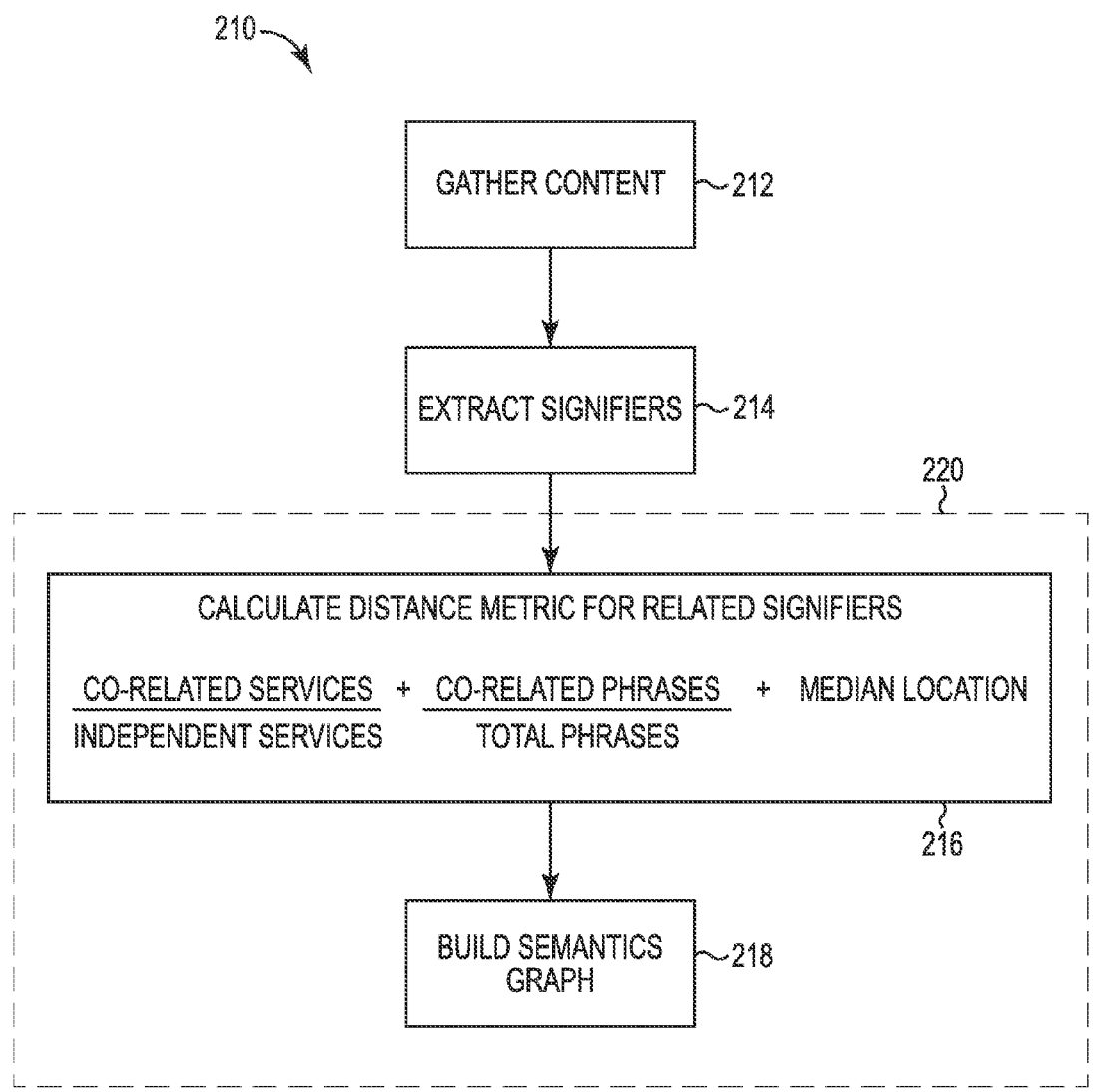
FIG. 2 is a flow chart illustrating an example of a process for building a semantics graph for an enterprise communication network according to the present disclosure.

FIG. 2 is a flow chart illustrating an example of a process 210 for building a semantics graph for an enterprise communication network according to the present disclosure.

At 212, the process 210 can include gathering content. For instance, a search tool can gather content from the enterprise network and/or the enterprise communication network. A search tool, as used herein, can include hardware components and/or computer-readable instruction components designated and/or designed to scan the enterprise network and/or the enterprise communication network to collect data. For instance, the search tool can search the enterprise network for the plurality of signifiers (e.g., words, phrases, and/or acronyms). The data can include documents and/or data associated with the enterprise communication network and/or the enterprise network. Such data can include Hypertext Markup Language (HTML) content, email communications, and/or other documents (e.g., SharePoint documents).

In various examples the present disclosure, a repository builder can gather the content and build a repository with the gather content. A repository builder can include hardware components and/or computer-readable instruction components designated and/or designed to build a repository. A repository can include a source storage system. For example, a repository can include a file folder and/or shared directory. The repository may store the gathered content, for instance.

At 214, the process 210 can include extracting signifiers. Signifiers can be extracted from the content gathered (e.g., at 212). For instance, an extraction tool may extract the signifiers. An extraction tool can include hardware components and/or computer-readable instruction components that extract information from an unstructured and/or semi-structured structure (e.g., the content gathered).

The extracted signifiers can include a plurality of words, phrases, and/or acronyms extracted through pattern recognition techniques. For instance, with HTML content, signifiers can be located in the title, lists, links, tables, paragraphs, and/or linked content (e.g., domains). The pattern recognition technique used by an extraction tool can identify the location and/or format of the title, lists, links, and tables on the HTML document and extract their members as signifiers.

At 216, the process 210 can include calculating (e.g., determining) distance metrics for related signifiers. A distance metric for related signifiers can include a calculated distance metric between a first signifier and a second signifier. The process 210 can be used to define a set of proximities (e.g., distance metrics) of the plurality of signifiers as extracted (e.g., at 214).

For instance, as illustrated in the example of FIG. 2, calculating a distance metric between a first signifier and a second signifier can include calculating a ratio of co-related services associated with the first signifier and the second signifier (e.g., related signifiers) associated with an enterprise communication network, calculating a ratio of co-related phrases associated with the first signifier and the second signifier, and averaging (e.g., median) a location of the first signifier and the second signifier on the enterprise network (e.g., a plurality of relationships defined based on a frequency of co-occurrences). The sum of the services ratio, the phrases ratio, and the average location can include the distance metric between the first signifier and the second signifier.

Calculating a ratio of co-related services associated with related signifiers can include:

$$d_1(u, v) = \frac{\sum (\text{services related to both } u \text{ and } v)}{\sum (\text{services related to } u + \text{services related to } v)},$$

wherein the calculated ratio $d_1$ (u,v) can include a sum of services related to both the first signifier u and the second signifier v divided by a sum of services related to the first signifier u plus services related to the second signifier v. Related services, as used herein, can include a service that references a signifier (e.g., u or v). Services related to both signifiers u, v can include domains and/or documents associated with a service that contains both signifiers u and v. Services related to u can include services related to the first signifier but not related to the second signifier (e.g., services that reference u but do not reference v). Services related to v can include services related to the second signifier but not related to the first signifier (e.g., services that reference v but do not reference u). In other words, the denominator in the ratio of $d_1$ (u,v) can include a sum of independent services (e.g., related to u independent of v and related to v independent of u).

In various examples of the present disclosure, determining services related to a first signifier u and a second signifier v can include determining services each signifier (e.g., u and v) is related to. Determining services related to a signifier can include calculating a distance from a service domain to a domain retrieved by the search tool (e.g., web crawler) that contains the signifier (e.g., u or v). The service domain (e.g., web page) can include an Internet page that is the main location of the service. The domain retrieved can include an Internet page that the signifier is located on. The distance from the service domain to the retrieved domain can include a number of links from the service domain to the retrieved domain. In some instances, there may be multiple paths (e.g., sequence of links) for a user to go from the retrieved domain to the service domain and/or vice versa. The distance, in such an instance, can include the path with the lowest number of links among the multiple paths. Thereby, each signifier can have a vector of distances between the retrieved domain and each service line. Related services to a signifier (e.g., first signifier u) can be based on retrieved domains the signifier appears on and a vector of distances from the retrieved domains. For instance, a related service can include a service with a distance between a retrieved domain and the service domain that is below a threshold distance.

The denominator in the ratio of $d_1$ (u,v) can include a normalization factor. In addition, the numerator can include a monotonically decreasing function and the denominator can include a monotonically increasing function. A monotonic function can include a function between ordered sets that preserves the order. A monotonically decreasing function can include a function wherein the Y-axis decreases (e.g., the distance metric) as the X-axis increases (e.g., sum of services related to both u and v). A monotonically increasing function can include a function wherein the Y-axis increases (e.g., distance metric) as the X-axis decreases (e.g., sum of services related to u plus the services related to v). Thereby, a distance metric for a first signifier and a second signifier can be smaller than a distance metric between a third signifier and a fourth signifier in response to identifying the first signifier and the second signifier relate to a service (e.g., and the third signifier and fourth signifier do not).

Calculating a ratio of co-related phrases associated with related signifiers can include:

$$d_2(u,v) = \alpha - s(u,v).$$

Alpha can denote a numerical value that remains constant. For instance, in some examples, alpha can be limited to a constant numerical value that is greater than the max of s(u,v). As used herein, s(u,v) can denote common phrases between a first signifier u and a second signifier v. For instance, s(u,v) can include a ratio of a sum of words common to both u and v divided by a sum of the number of words in u plus the number of words in v (e.g., the total phrases of u and v). For example, s(u,v) can be defined as:

$$s(u, v) = \frac{\sum (\text{words common to } u \text{ and } v)}{\sum (\text{number of words in } u + \text{number of words in } v)}.$$

Thereby, a distance metric for a first signifier and a second signifier can be smaller than a distance metric between a third signifier and a fourth signifier in response to identifying the first signifier and the second signifier have co-related words (e.g., and the third signifier and fourth signifier do not).

Calculating an average of the location (e.g. distance) between related signifiers can include:

$$d_3(u,v) = \text{median}(\text{location between } u \text{ and } v).$$

The average location between u and v can include a median of the location distances between u and v on an HTML domain. For example, $d_3$ (u,v) can be defined by a plurality of criteria. The criteria can include rules. An example of the plurality of rules can include:
  a. if u and v appear on linked domains than the distance between u and v may be smaller than if they do not.
  b. if u and v appear on the same (e.g., identical) domain, than the distance between u and v may be smaller than if they do not and smaller than (a).
  c. if u and v appear in the same (e.g., identical) sub-portion (e.g., table, list, paragraph) of the same domain, than the distance between u and v may be smaller than if they do not and smaller than (a) and (b).

Thereby a mathematical representation of the rules can include distance a>distance b>distance c. A smaller distance can indicate signifiers are more related than a larger distance, for instance. Although the present example illustrates the average location as a median of the location, examples in accordance with the present disclosure are not so limited. An average location can include a mean, a geometric mean, an average percentage, and/or a mode, among other averaging techniques.

As an example of calculating $d_3$, four signifiers may be identified on an enterprise network and/or an enterprise communication network. The first signifier u may be related to the second signifier v and may be located on HTML domains linked together. The second signifier v may be related to the third signifier w but not located on linked HTML domains. The first signifier u and the third signifier w may be unrelated. The third signifier w may be related to the fourth signifier y and may be found on the same HTML domain. The first signifier u may be related to the fourth signifier y and may be found on the same table and/or list on the same HTML domain. The second signifier v and the fourth signifier y may be found to be unrelated. The distance metrics associated with the four signifiers (e.g., u, v, w, y) can be summarized as:

$$d_3(u,y)<d_3(w,y)<d_3(u,v)<d_3(v,w)<d_3(v,y),d_3(u,w).$$

The distance metric can be denoted by, for example:

$$d(u,v)=d_1(u,v)+d_2(u,v)+d_3(u,v),$$

and can be calculated for each subset of related signifiers (e.g., each pair of related signifiers). Thereby, a plurality of distance metrics calculated for a plurality of related signifiers can include a set of proximities between the plurality of signifiers.

At 218, the process 210 can include building a semantics graph for the enterprise communication network. The semantics graph can be built using the calculated distance metric between the first signifier and the second signifier. In various examples of the present disclosure, the semantics graph can include the defined distance metrics of the plurality of pairs of related signifiers. The set of proximities can be represented (e.g., added to the semantics graph) as edges between the nodes as defined by the distance metrics between related signifiers. The set of edges includes a set of proximities of the plurality of signifiers as defined by distance metrics between pairs related signifiers.

The process 210 can utilize a semantics builder 220 for calculating distance metrics for related signifiers (e.g., 216) and/or building the semantic graph (e.g., 218). The semantics builder 220 can include hardware components and/or computer-readable instruction components designated and/or designed to build a semantics graph associated with the enterprise communication network. For instance, the semantics graph can include the set of signifiers as nodes with a set of proximities between the set of signifiers. The set of proximities can be represented (e.g., added to the semantics graph) as edges between the nodes as defined by the distance metrics between related signifiers.

Figure 3:
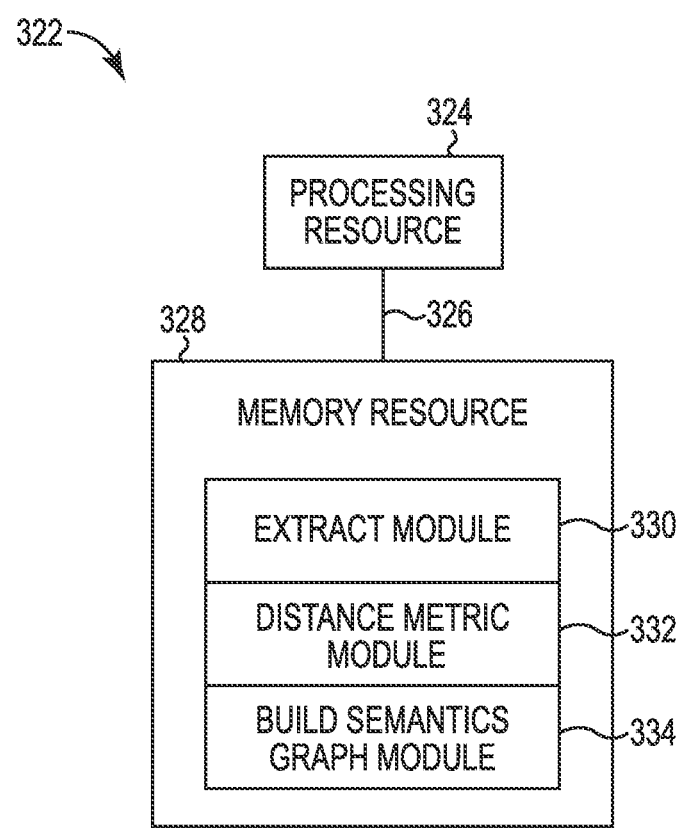
FIG. 3 illustrates an example of a system according to the present disclosure.

FIG. 3 illustrates a block diagram of an example of a system 322 according to the present disclosure. The system 322 can utilize software, hardware, firmware, and/or logic to perform a number of functions.

In a number of examples, the system 322 can be any combination of hardware (e.g., one or more processing resource 324, computer-readable medium (CRM), etc.) and program instructions (e.g., computer-readable instructions (CRI)) configured to build a semantics graph for an enterprise communication network. A processing resource 324, as used herein, can include any number of processors capable of executing instructions stored by a memory resource 328. Processing resource 324 can be integrated in a single device or distributed across devices.

The memory resource 328 can be in communication with a processing resource 324 (e.g., one or more processing devices). For instance, the processing resource 324 can be in communication with a tangible non-transitory CRM (e.g., memory resource 328) storing a set of CRI executable by the processing resource 324, as described herein. The CRI can also be stored in remote memory managed by a server and represent an installation package that can be downloaded, installed, and executed. The system 322 can include memory resource 328, and the processing resource 324 can be coupled to the memory resource 328. Further, memory resource 328 may be fully or partially integrated in the same device as processing resource 324 or it may be separate but accessible to that device and processing resource 324. Thus, it is noted that the system 322 may be implemented on a user and/or a client device, on a server device and/or a collection of server devices, and/or on a combination of the user device and the server device and/or devices.

Processing resource 324 can execute CRI that can be stored on an internal or external memory resource 328. The processing resource 324 can execute CRI to perform various functions, including the functions described with respect to FIG. 1 and FIG. 2.

The CRI can include a number of modules 330, 332, 334. The number of modules 330, 332, 334 can include CRI that when executed by the processing resource 324 can perform a number of functions.

The modules 330, 332, 334 can be sub-modules of other modules. For example, the distance metric module 332 and the build semantics graph module 334 can be sub-modules and/or contained within the same computing device. In another example, the modules 330, 332, 334 can comprise individual modules at separate and distinct locations (e.g., CRM, etc.).

An extract module 330 can include CRI that when executed by the processing resource 324 can provide a number of extraction functions. The extract module 330 can extract a plurality of signifiers from an enterprise network and/or an enterprise communication network using an extraction tool.

In various examples of the present disclosure, the system 322 can include a search module (not illustrated in the example of FIG. 3). The search module can include CRI that when executed by the processing resource 324 can provide a number of search functions. The search module can search the enterprise network and/or the enterprise communication network for content (e.g., documents, signifiers, and/or other relevant data). The content searched for by the search module can be used by the extract module 330 to extract the plurality of signifiers, for instance.

A distance metric module 332 can include CRI that when executed by the processing resource 324 can perform a number of calculation functions. The distance metric module 332 can define a distance metric between pairs of related signifiers among the plurality of signifiers. Related signifiers can include signifiers that have a co-occurrence on the enterprise network and/or the enterprise communication network.

The distance metric module 332 can include instructions to define a distance metric between pairs of related signifiers that includes instructions to calculate a ratio of co-related services associated with both a first signifier and a second signifier and services related independently to the first signifier and services related independently to the second signifier; calculate a ratio of co-related phrases associated with both the first signifier and the second signifier and phrase related independently to the first signifier and to the second signifier; average a location of the first signifier and the second signifier on the enterprise network; and, define the distance metric as a sum of the ratio of co-related services, the ratio of co-related phrases, and the average location.

A build semantics graph module 334 can include CRI that when executed by the processing resource 324 can perform a number of building graph functions. The build semantics graph module 334 can build a semantics graph using the defined distance metrics between pairs of related signifiers, including the defined distance metric of the first signifier and the second signifier.

A memory resource 328, as used herein, can include volatile and/or non-volatile memory, and can be integral, or communicatively coupled, to a computing device, in a wired and/or a wireless manner. The memory resource 328 can be in communication with the processing resource 324 via a communication path 326 local or remote to a machine (e.g., a computing device) associated with the processing resource 324. The communication path 326 can be such that the memory resource 328 is remote from the processing resource (e.g., 324), such as in a network connection between the memory resource 328 and the processing resource (e.g., 324).

The processing resource 324 coupled to the memory resource 328 can execute CRI to extract a plurality of signifiers from an enterprise network using an extraction tool. The processing resource 324 coupled to the memory resource 328 can also execute CRI to define a distance metric between related signifiers among the plurality of signifiers, wherein defining a distance metric between each pair of related signifiers includes: calculate a ratio of co-related services associated with both a first signifier and a second signifier and services related independently to the first signifier independent and services related independently to the second signifier; calculate a ratio of co-related phrases associated with both the first signifier and the second signifier and phrases related independently to the first signifier and phrases related independently to the second signifier; average a location of the first signifier and the second signifier on the enterprise network; and define the distance metric as a sum of the ratio of co-related services, the ratio of co-related phrases, and the average location. The processing resource 324 coupled to the memory resource 328 can also execute CRI to build a semantics graph for the enterprise communication network using the defined distance metrics between pairs of related signifiers, including the defined distance metric of the first signifier and the second signifier.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A non-transitory computer-readable medium storing a set of instructions executable by a processing resource, wherein the set of instructions can be executed by the processing resource to:
    calculate a ratio of co-related services associated with a first signifier and a second signifier associated with an enterprise communication network;
    calculate a ratio of co-related phrases associated with the first signifier and the second signifier;
    average a location of the first signifier and the second signifier on a enterprise network; and
    build a semantics graph for the enterprise communication network using a distance metric between the first signifier and the second signifier, wherein the distance metric is defined using the ratio of co-related services, the ratio of co-related phrases, and the average location.

2. The medium of claim 1, wherein the instructions executable by the processing resource to define the distance metric include instructions to define a smaller distance metric between the first signifier and the second signifier than a distance metric between a third signifier and fourth signifier in response identifying the first signifier and the second signifier relate to a service.

3. The medium of claim 1, wherein the instructions executable by the processing resource to define the distance metric include instructions to define a smaller distance metric between the first signifier and the second signifier than a distance metric between a third signifier and fourth signifier in response to identifying the first signifier and the second signifier have co-related words.

4. The medium of claim 1, wherein the instructions executable by the processing resource to define the distance metric include instructions to define a smaller distance metric between the first signifier and the second signifier than a distance metric between a third signifier and fourth signifier in response to identifying the first signifier and the second signifier appear on linked domains.

5. The medium of claim 1, wherein the instructions executable by the processing resource to define the distance metric include instructions to define a smaller distance metric between the first signifier and the second signifier than a distance metric between a third signifier and fourth signifier in response to identifying the first signifier and the second signifier appear on an identical domain.

6. The medium of claim 1, wherein the instructions executable by the processing resource to define the distance metric include instructions to define a smaller distance metric between the first signifier and the second signifier than a distance metric for a third signifier and fourth signifier in response to identifying the first signifier and the second signifier appear on an identical sub-portion of a domain.

7. A system for building a semantics graph for an enterprise communication network comprising:
    a processing resource; and
    a memory resource communicatively coupled to the processing resource containing instructions executable by the processing resource to:
        extract a plurality of signifiers from an enterprise network using an extraction tool;
        define a distance metric between pairs of related signifiers among the plurality of signifiers, wherein defining a distance metric between each pair of related signifiers includes:
            calculate a ratio of co-related services associated with both a first signifier and a second signifier and services related independently to the first signifier and services related independently to the second signifier;
            calculate a ratio of co-related phrases associated with both the first signifier and the second signifier and phrases related independently to the first signifier and phrases related independently to the second signifier;
            average a location of the first signifier and the second signifier on the enterprise network; and
            define the distance metric as a sum of the ratio of co-related services, the ratio of co-related phrases, and the average location; and
        build a semantics graph for the enterprise communication network using the defined distance metrics between pairs of related signifiers, including the defined distance metric of the first signifier and the second signifier.

8. The system of claim 7, wherein the instructions executable to build the semantic graph includes instructions to:

add edges to the semantics graph, wherein the edges include a set of proximities of the plurality of signifiers as defined by distance metrics between pairs related signifiers.

9. The system of claim 7, wherein the instructions executable to calculate the ratio of co-related services includes instructions to calculate a monotonically decreasing function divided by a monotonically increasing function.

\* \* \* \* \*